Jan. 31, 1956  C. L. HALLOCK  2,732,612
DEBURRING TOOL
Filed Oct. 11, 1951
Fig. 1.
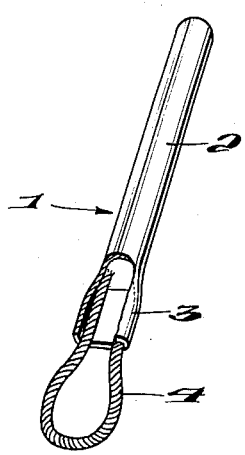
Fig. 2.
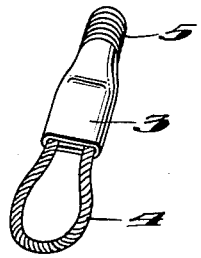
Fig. 3.
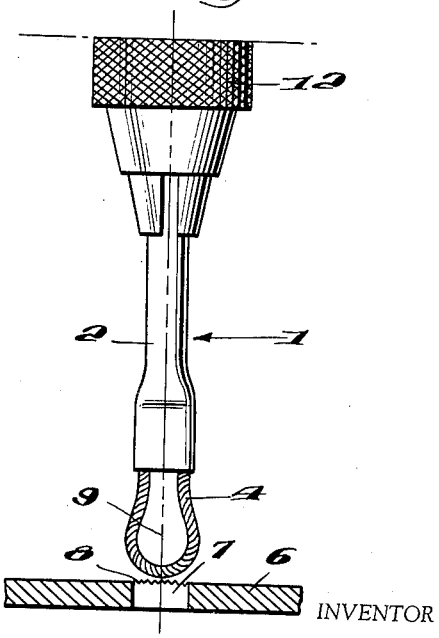
Fig. 4.
INVENTOR
CLAIR L. HALLOCK,
BY *Martin E. Hogan Jr.*
ATTORNEY

United States Patent Office 2,732,612
Patented Jan. 31, 1956

2,732,612
DEBURRING TOOL

Clair L. Hallock, Baltimore, Md., assignor to The Glenn L. Martin Company, Middle River, Md., a corporation of Maryland Application October 11, 1951, Serial No. 250,891

1 Claim. (Cl. 29—90)

This invention relates to a new and improved deburring tool for removing burrs raised on the edges of holes drilled, punched, or sawed in metal or other material. Since such burrs are highly undesirable, and must ordinarily be removed before the hole is fit for its intended function or use, a number of tools have been proposed and used for that purpose. However, all of the previously proposed tools incorporate sharpened cutting edges for cutting away the burr as the tool is rotated. Such tools are relatively expensive and require the exercise of considerable skill and care on the part of the operator for satisfactory performance. If, for example, the length of time or the pressure required to remove a burr is overestimated by the operator, the edges of the hole may be cut away to an excessive depth. Such a condition is especially undesirable when the hole to be deburred is through relatively thin material, since excessive cutting by the deburring tool may enlarge the hole to such an extent that it is unfit for use.

It is obviously desirable to provide a deburring tool which is effective to quickly remove the burr, but which is considerably less effective to remove further material from the edge of the hole after the burr has been removed, thus making it possible for an inexperienced operator to use the tool without the danger of inadvertently cutting away an excessive amount of material from the edge of the hole.

The tool contemplated by the present invention is extremely simple in construction, novel, and inexpensive. Its use requires little or no skill, and while it will quickly and effectively remove any burr from a hole, the absence of sharp cutting edges will prevent excessive rotation of the tool from removing any substantial amount of material from the mouth of the hole after the burr has been removed.

Since there are no sharp cutting edges on the proposed tool, expensive grinding and sharpening operations are not required in its manufacture. In addition, the lack of sharp edges greatly reduces the danger of inadvertently marring the surface of the material upon which the tool is being used.

An additional advantage of the proposed tool lies in the fact that the tool may be constructed in many sizes, and since a single tool is effective to remove the burr from holes having a considerable range of diameters, a few tools of various sizes will have sufficient range to deburr holes over a very wide range of sizes.

It is an object of this invention to provide a novel deburring tool which requires no sharp cutting edges, is simple in operation and inexpensive to construct.

It is another object of this invention to provide a tool which will quickly and effectively remove the burr from a hole but which will be much less effective to remove additional material from the edge of the hole after the burr has been removed.

It is a further object of this invention to provide a deburring tool which requires little or no skill to operate and hence may be effectively used by an inexperienced operator without danger of damaging the hole being deburred or marring the surface surrounding the hole.

It is a still further object of this invention to provide a tool which may be produced in a variety of sizes, each size being effective to remove the burr from a number of holes of various diameters, so that only a few tools are required to deburr a large number of holes of widely varying diameters.

The construction and mode of operation of the new and improved deburring tool contemplated by this invention will become apparent from an inspection of the accompanying drawings together with the following description.

Fig. 1 is a view of one form of the tool partially cut away to show the position of the ends of the cable within the flattened end of the holder.

Fig. 2 is a view of the tool with the end of the holder threaded for attachment to an adapter or the like.

Fig. 3 is a fragmentary view showing the construction of the stranded wire cable used in the loop.

Fig. 4 is a view showing the tool gripped in a conventional drill chuck, and showing the relative position of the tool with respect to a hole about to be deburred.

As shown in Fig. 1, the deburring tool 1 is composed of a length of flexible twisted wire cable formed into a loop or bight 4, the ends of which extend into the tubular holder 2 which is flattened at its end 3 to securely grip the cable loop 4. The holder 2, in its simplest form as shown in Fig. 1, comprises a length of tubing of suitable diameter to receive the ends of the cable loop 4, and having sufficient strength to be gripped in the chuck of a drill press or similar rotary equipment. To adapt the tool for use with other types of rotation imparting devices the holder may be threaded at its end 5 as shown in Fig. 2 for attaching the tool to threaded adapters and the like.

It is to be understood that the holder might have other configurations, and various methods of attaching the cable loop to the holder might be devised and used without departing from the scope of this invention.

As shown in Fig. 3, the cable used in the loop 4 is made up of a plurality of twisted strands 10, each of which is in turn composed of a plurality of individual wires 11 twisted together to form the strands. The individual wires which form the strands are twisted together in one direction, while the strands are twisted in the opposite direction to form the cable, with the result that those portions of the individual wires 11 exposed to the exterior of the cable extend substantially parallel to the longitudinal axis of the cable, so that as the tool rotates, the individual wires are perpendicular to the direction of rotation and are therefore effective to cut away the burr from the edge of the hole. Cable of the type described is commonly known as regular lay cable, and has been found to be particularly effective for this purpose. It is readily available on the open market in a great variety of sizes, and deburring tools of the type proposed can be quickly and inexpensively produced for any desired range of hole sizes.

To obtain the most effective burr removing action it has been found desirable to construct the tool with the radius of curvature of the working portion of the loop being relatively small compared to the diameter of the cable, so that the loop has the desired stiffness for cutting the burr. A ratio of loop radius to cable diameter of approximately 2 to 1 has been found to be effective for small tools with the ratio increasing as the size of tool increases. However, it is not intended to limit this invention to the precise ratio given as considerable variation may be made in the dimensions of the tool without substantially affecting its deburring ability.

In operation, the tool is gripped in the chuck of a drill press 12 or is attached to other equipment for imparting rotary motion to the tool about axis 9, as shown in Fig. 4, and as the rotating cable loop 4 is held against the mouth of the hole 7 the wires 11 of the cable, being perpendicularly disposed with respect to the edge of the hole, are effective to shear off the burr 8. Once the burr has been removed, the wires 11 merely rub the now smooth edge of the hole, since they carry no sharp cutting edges, and further removal of material from the edge of the hole is minimized in the event that the operator fails to promptly remove the rotating tool from the hole after the burr has been cut away.

While the tool proposed herein has been found to be particularly effective for deburring holes drilled in metals such as aluminum, magnesium, and their alloys, leaving the edge of such holes clean and smooth, it is also effective for deburring holes in other materials including fiber and plastics.

It should be understood that this invention is not confined to the precise details of construction herein set forth, as it is apparent that many changes and variations may be made without departing from the scope of the invention, and no limitation is intended by the phraseology of the foregoing description or illustration in the accompanying drawings.

I claim as my invention:

A deburring tool comprising a holder having an elongated shank at one end adapted to be gripped in a chuck of a rotary tool, and walls forming an open recess in the other end facing away from said shank and concentric therewith, a short length of flexible stranded wire cable having a central portion bent back upon itself so as to form a generally U-shaped loop portion of relatively short radius of curvature with the ends of the cable being arranged generally parallel and alongside one another, the ends of said loop received in said recess and held by the said walls of said holder with the bisector of said loop aligned with the axis of rotation of said shank, the diameter of said stranded wire being such that the loop will have sufficiently rigidity when rotated and projected into a circular opening in a metal member to deburr the edges of the opening.

References Cited in the file of this patent

UNITED STATES PATENTS

| | | |
|---|---|---|
| 1,147,824 | Soule | July 27, 1915 |
| 1,562,327 | Hedeen | Nov. 17, 1925 |
| 1,626,491 | Wright | Apr. 26, 1927 |
| 1,721,106 | Fischbeck | July 16, 1929 |
| 1,837,904 | Hanelt | Dec. 22, 1931 |
| 2,327,683 | Warner et al. | Aug. 24, 1943 |
| 2,346,412 | Bratz | Apr. 11, 1944 |
| 2,450,075 | Bashara | Sept. 28, 1948 |